United States Patent [19]

Lorenz

[11] 4,119,254
[45] Oct. 10, 1978

[54] APPARATUS FOR PULLING ELONGATED WORKPIECES

[75] Inventor: Horst Lorenz, Solingen, Fed. Rep. of Germany

[73] Assignee: Th. Kieserling & Albrecht, Solingen, Fed. Rep. of Germany

[21] Appl. No.: 758,949

[22] Filed: Jan. 12, 1977

[30] Foreign Application Priority Data

Jan. 12, 1976 [DE] Fed. Rep. of Germany ....... 2600898

[51] Int. Cl.² .................... B65H 51/18; B65H 17/34
[52] U.S. Cl. ................................ 226/112; 72/290; 226/115; 226/162
[58] Field of Search ............... 226/112, 111, 115, 116, 226/162, 108, 158, 159, 166; 72/290; 214/1.1

[56] References Cited

U.S. PATENT DOCUMENTS

| 543,914 | 8/1895 | Watson et al. | 72/290 X |
| 2,389,556 | 11/1945 | Siegerist | 226/112 UX |

Primary Examiner—Bruce H. Stoner, Jr.
Attorney, Agent, or Firm—Edward E. Sachs

[57] ABSTRACT

Apparatus for pulling elongated workpieces and which apparatus includes a pair of reciprocating clamping devices disposed in a side-by-side relationship and movable in towing and return directions. Elongated rotatable drive shafts extending parallel to the pulling and return directions include helical pulling and return drive paths. Drive path followers on each clamping device switch between the pulling drive path and return drive path for reciprocating the clamping devices.

8 Claims, 5 Drawing Figures

APPARATUS FOR PULLING ELONGATED WORKPIECES

BACKGROUND OF THE INVENTION

This application is generally directed to the art of pulling elongated workpieces and, more particularly to draw benches or drawing devices for peeling machines.

Draw benches and the like for drawing materials through a drawing die are known to include two clamping devices arranged in tandem to act alternately for continually drawing material through a drawing die. In one known arrangement, one clamping device travels on one half the length of the draw bench bed while the other clamping device travels on the other half of the length of the draw bench bed. The clamping devices are reciprocatingly driven by a roller cone projecting downward from each clamping device into engagement with a curve on the circumference of a large diameter shaft rotatably mounted under the clamping devices in the machine frame. Each clamping carriage is assigned an approximately eliptical curve on the surface of the large diameter shaft.

In drawing devices of the type described, the speed and drawing force are limited by the curve in the large diameter shaft. Where the same curve is used for movement of a carriage in both the pulling and return directions, the type of curve capable of being used is very limited. If the curve is relatively flat and has a high pitch, rapid return of a clamping device is achieved but such a flat curve causes very high transverse forces when the clamping device is moved in the pulling direction. The transverse forces can be reduced by increasing the diameter of the shaft but limitations of the machine frame usually prevents use of extremely large shaft diameters. With each clamping device travelling over only one half of the length of the machine bed, the change-over frequency of the two clamping devices must be quite high.

BRIEF DESCRIPTION OF THE INVENTION

A drawing machine of the type described which includes separate drive shafts having generally helical pulling and return drive paths for effecting movement of the clamping devices in the pulling and return directions. A drive path follower on each clamping device is switched between the pulling drive path and the return drive path. Movement of the clamping devices in the return direction can be very rapid because the shaft having the return drive path can be rotated at a greater speed, or the pitch of the return drive path can be very low so the return drive path is relatively flat.

In a preferred arrangement, there are at least two shafts and each is provided with only one drive path. One shaft has a path for movement of the clamping devices in the workpiece pulling direction and the other shaft has a helical path for moving the clamping devices in a return direction.

Careful consideration must be given to the transfer of force from one clamping device to another. It is necessary to provide and compensate for stress relief due to expansion of the apparatus frame and the workpiece. When one clamping device approaches the discharge end of the apparatus in the pulling direction, it is ready to transfer the pulling force over to the clamping device located close to the intake end of the apparatus. While the clamping device which is pulling the workpiece is located a short distance from the discharge end of the apparatus and is moving with drawing speed, the clamping device at the intake end of the apparatus is accelerated to drawing speed and then clamped onto the workpiece. The two clamping devices are subsequently moved toward each other slightly to compensate for the expansion of the apparatus frame and the workpiece. The speed of the clamping device adjacent the discharge end of the apparatus is slowed down while the speed of the clamping device moving from the intake end of the apparatus is increased. The slight compensation movement of the clamping devices toward one another is achieved by slightly changed curve pitches. During the compensating movement of the two clamping devices relative to one another, the clamping device moving from the intake end of the apparatus takes over the full pulling effort on the workpiece for drawing it through the drawing die. At the same time, the clamping device near the discharge end of the apparatus releases the workpiece and is braked to zero velocity for movement in the return direction.

When the reciprocating clamping devices pass each other between the machine intake and discharge ends, at least the clamping units on the clamping devices must transversely move in order to facilitate such passing. This is accomplished by arranging the clamping devices for transverse movement in a manner such that switching of a clamping device from movement in the pulling direction to movement in the return direction also moves the clamping device transversely to provide passing clearance for the other clamping device when they pass one another.

The principal object of the present invention is to provide an improved apparatus for pulling elongated workpieces.

Another object of the present invention is to provide such an apparatus which is capable of having a very high frequency for the clamping devices and which also achieves high pulling forces while minimizing transfer forces.

A further object of the present invention is to provide improved apparatus for pulling elongated workpieces wherein each clamping device is transversely movable while traveling in a return direction to provide clearance for the clamping device moving in the pulling direction.

Still another object of the present invention is to provide apparatus for pulling elongated workpieces with a drive arrangement for moving the clamping devices at a greater speed in the return direction than in the pulling direction.

BRIEF DESCRIPTION OF THE DRAWINGS

The invention may take physical form in certain parts and arrangements of parts, a preferred embodiment of which will be described in detail in the specifications and illustrated in the accompanying drawings which form a part hereof and wherein.

DESCRIPTION OF A PREFERRED EMBODIMENT

Figure 1:
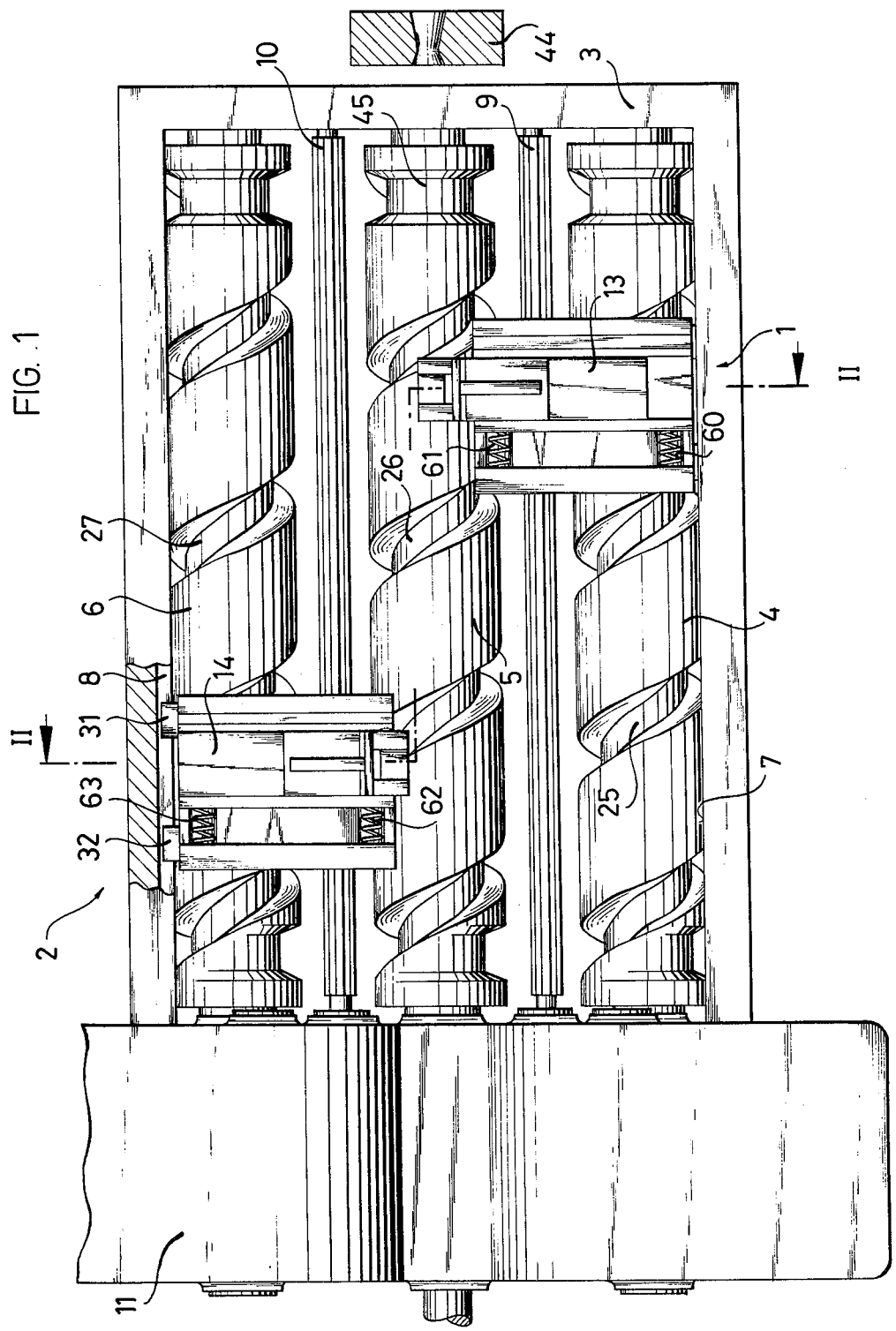
FIG. 1 is a top plan view of an apparatus for pulling elongated workpieces.
Figure 2:
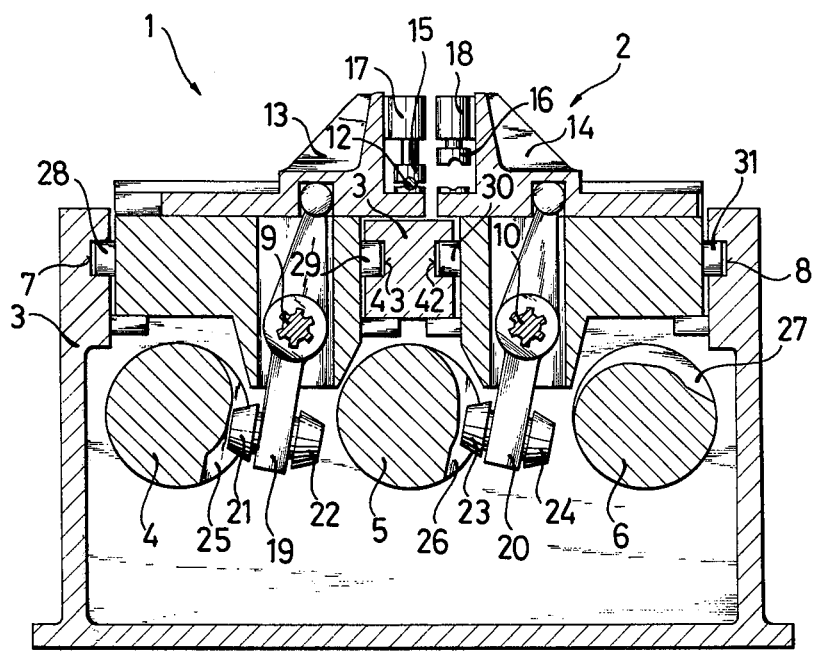
FIG. 2 is a cross-sectional elevational view taken along lines II—II of FIG. 1.

Referring now to the drawings, wherein the showings are for purposes of illustrating a preferred embodiment of the invention only and not for purposes of limiting same, FIG. 1 shows an apparatus for pulling elongated workpieces as including two clamping devices 1 and 2 positioned in a side-by-side relationship for reciprocating movement in pulling and return directions relative to apparatus frame 3 along longitudinal guides 7 and 8 as shown in FIG. 1, and along additional guides 42 and 43 as shown in FIG. 2. A drawing die 44 is located in the intake side of the apparatus and the clamping devices 1 and 2 act for substantially continuously pulling material through the die 44.

Rotatably mounted in the apparatus frame 3 are three drive shafts 4, 5 and 6 which extend parallel to the reciprocating directions of the clamping devices 1 and 2. In the three shaft arrangement of FIGS. 1 and 2, the shafts 4, 5 and 6 are arranged horizontally side-by-side.

Longitudinally splined change-over or switching shafts 9 and 10 have their ends rotatably mounted in the frame 3 and extend parallel with the shafts 4, 5 and 6. One switching shaft 9 passes freely through the one clamping device 1 and the other switching shaft 10 passes freely through the other clamping device 2. All of the shafts 4, 5, 6, 9 and 10 extend into a gear box 11.

Each clamping device 1 and 2 has a clamping unit 13 and 14, respectively, which shift transversely relative to one another. With reference to FIG. 2, each clamping unit 13 and 14 on each clamping device 1 and 2 is capable of moving horizontally outwardly away from the workpiece 12. This allows the clamping devices to pass one another. In the arrangement of FIG. 2, the clamping unit of the clamping device 2 is moved transversely away from the other clamping device. The clamping devices are also slightly shiftable in the pulling direction against the action of springs 60, 61, 62 and 63. Clamping jaws 15 and 16 for clamping units 13 and 14 are actuated by hydraulic cylinders 17 and 18.

As best shown in FIG. 2, levers 19 and 20 are mounted on the switching shafts 9 and 10 for axial movement therealong with the clamping devices 1 and 2 and for pivotal movement with shafts 9 and 10. One end of each lever 19 and 20 extends into a clamping unit 13 and 14 and is movably guided therein. If so desired, an additional lever can be provided in order to maintain the transverse motion of the clamping units as small as necessary in order to permit the clamping devices to pass one another. The opposite ends of the levers 19 and 20 project downwardly from the clamping devices and each has two roller cones 21 and 22, and 23 and 24 thereon. By pivoting the levers 19 and 20 with the switching shafts 9 and 10, the roller cones can be alternately brought into engagement with different curves or drive paths.

For example, generally helical drive paths 25, 26 and 27 are provided on drive shafts 4, 5 and 6. The roller cone 21 is engaged with the pulling drive path 25 for moving the clamping device 1 in the pulling direction. Pivotal movement of the lever 19 with the switching shaft 9 will move the roller cone 21 out of engagement with the pulling drive path 25 and move the roller cone 22 into engagement with the return drive path 26. Likewise, the roller cone 23 is shown engaged with the return drive path 26. Pivotal movement of the lever 20 with the switching shaft 10 will disengage the roller cone 23 from the return drive path 26 and move the roller cone 24 into the pulling drive path 27. The roller cones may be considered to define drive path follower means for following the respective drive paths to reciprocate the clamping devices. The drive paths 25, 26 and 27 are generally helical and take several turns from one end to the other of their respective shafts. The paths are shown as grooves but it will be appreciated that outwardly extending flanges can also be helically arranged with the drive path followers then taking the form of rollers located on opposite sides of the flanges.

Figure 3:
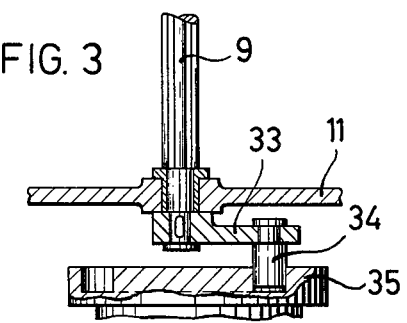
FIG. 3 is a partial cross-sectional view taken along lines III—III of FIG. 4.
Figure 4:
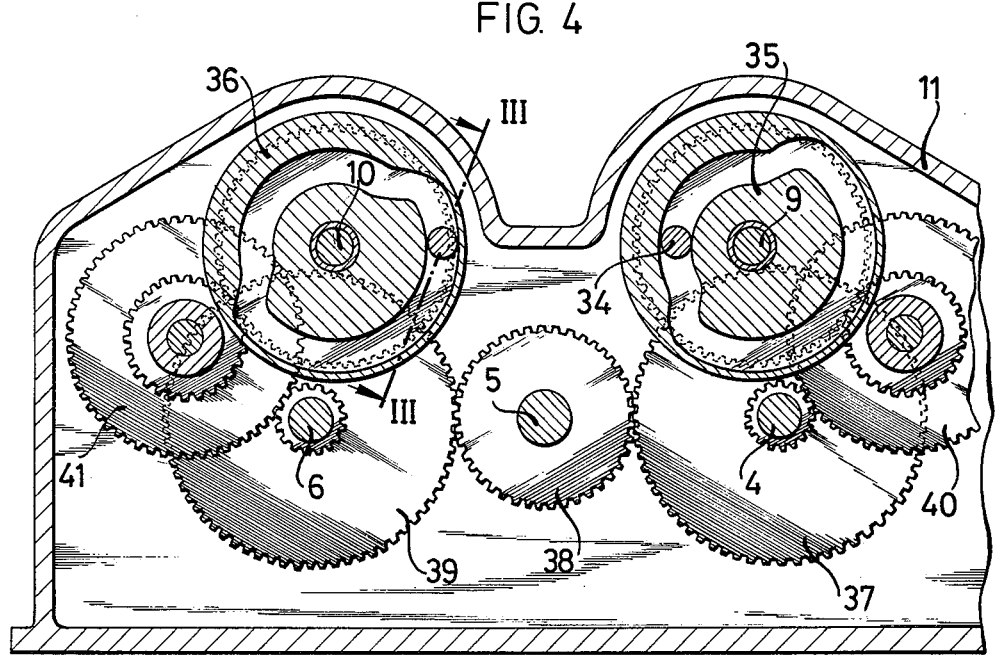
FIG. 4 is an end view of a gearing arrangement.

Adjacent the gear box 11 for reversing movement of the clamping devices, the switching shafts 9 and 10 have gearing levers 33 as shown in FIG. 3 engaging with control rollers 34 which extend into cam traces included in cam disc 35 and 36. Interconnected toothed wheels 37, 38 and 39 are provided on shafts 4, 5 and 6, as shown in FIG. 4. Toothed wheels 37 and 39 are drivingly connected with intermediate gears 40 and 41 which are, in turn, drivingly connected with gear teeth on the cam discs 35 and 36.

Figure 5:
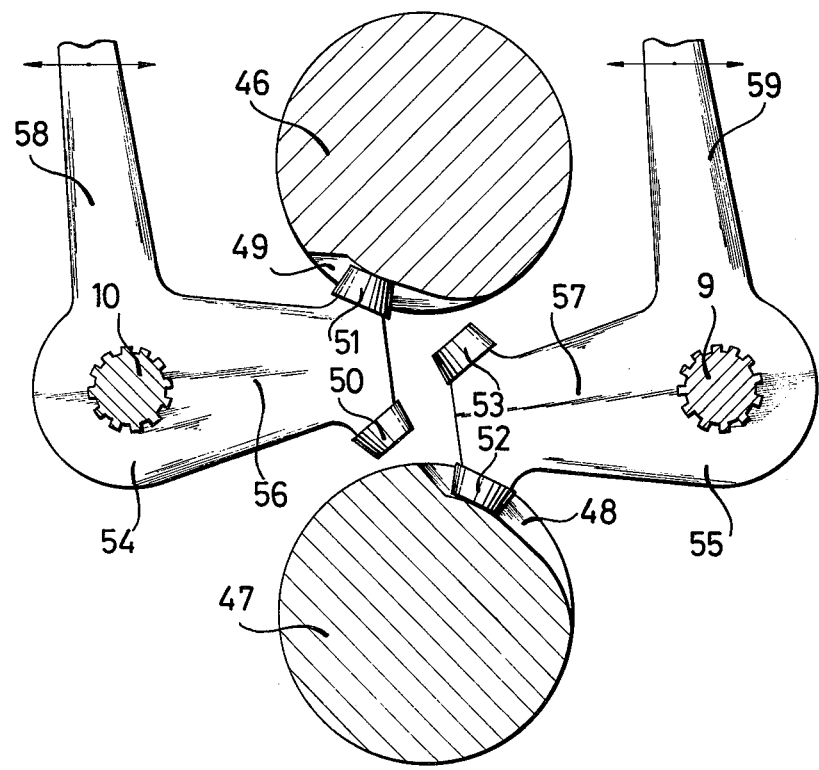
FIG. 5 is an elevational view in partial cross-section showing a simplified drive arrangement.

FIG. 5 shows a simplified arrangement having two drive shafts 46 and 47 including helical drive paths 48 and 49. By way of example, drive path 48 may be considered as the return drive path. Angle lever 54 has a return drive path follower 51 and a pulling drive path follower 50. Angle lever 55 has a pulling drive path follower 52 and a return drive path follower 53. The angle levers 54 and 55 are axially movable along the switching or reversing shafts 9 and 10 but are splined thereto against relative rotational movement. The angle levers 54 and 55 operate in generally the same manner as the levers 19 and 20 for moving clamping devices in pulling and return directions.

In the arrangement of FIG. 5, one arm 56 and 57 of each angle lever 54 and 55 projects between the shafts 46 and 47. The other arms 58 and 59 of the angle levers extend upwardly into the clamping units which are transversely movable horizontally outwardly and inwardly relative to the workpiece. The levers 54 and 55 transfer forces to the clamping units and thereby to the entire clamping devices for moving same in the pulling or return direction.

For a brief description of the operation of the apparatus, reference is made to FIG. 1 wherein the clamping device 1 is pulling a workpiece through the drawing die 44 while the clamping device 2 is moving in a return direction toward the drawing die 44. The clamping unit 13 on the clamping device 1 is in its working position whereas the clamping unit 14 on the clamping device 2 is moved transversely away from clamping device 1 so the clamping devices can pass one another. Return movement of the clamping device 2 takes place at a higher speed than movement of either clamping device in the pulling direction by arranging the gear ratio or the helical return path pitch, or both, to effect a higher return speed.

When the clamping device 1 is located a short distance from gear box 11, the clamping device 2 will have already reached outlet 45 of the return drive path 26. In the outlet 45, the clamping device 2 goes through a short rest period when the lever 20 of FIG. 2 is switched over from the return drive path 26 to the pulling drive path 27. This shifts the clamping unit 14 transversely toward the workpiece to align the clamping unit with the workpiece and the opening in the drawing die 44. This pivotal movement of the lever 20 is controlled by the switching or reversing shaft 10 whose movement is controlled by the gear box 11.

Immediately upon switching over from the return drive path to the pulling drive path, the lever 20 begins to accelerate in the pulling direction for accelerating the clamping device 2 up to desired pulling speed. When the clamping device reaches pulling speed, the clamping unit 14 is operated by the cylinder 18 so that the clamping jaws 16 firmly grip the workpiece 12. Both clamping units are now tightly gripping the workpiece and during this phase of the operation, a shifting of the clamping devices takes place relative to an imaginary workpiece section still present in the drawing die 44 to be drawn out with substantially constant uniform speed.

The taking over clamping device 2 is moved forwardly in the pulling direction by being pushed so there is no play and the clamping device itself is prestressed with the pulling force. At this point in time, the clamping device 2 takes over the pulling force from the clamping device 1. At the same time, the clamping device 1 moves back relative to the imaginary workpiece section still in the drawing die 44 so that it and the workpiece section between the clamping devices can relax. It is desired to prevent compression or kinking of the workpiece section between the clamping devices and this can be accomplished by slightly shifting the clamping unit 13 in the pulling direction against the action of the springs 60 and 61.

Subsequent operation of the cylinder 17 releases the workpiece and the clamping device 1 is braked to zero speed. The lever 19 is then switched over so the entire clamping device 1 is moved back in the return direction. This is accomplished by having the roller cone 22 engage the return path 26 while the cone 21 moves out of engagement with the pulling drive path 25. The acceleration and displacements of the clamping devices and clamping units are effected exclusively by the drive paths 25, 26 and 27 and by their pitches.

Switching over of the clamping units 13 and 14 is carried out by the gearing for the shafts 4, 5, 6, 9 and 10 and their interaction in the gear box 11. The drive paths 25 and 27 on the shafts 4 and 6 are responsible for movement in the pulling direction while the shaft 5 is responsible for movement of both clamping devices in the return direction. The shaft 5 revolves faster as is evidenced from the gear ratio shown in FIG. 4. A motor is used to directly drive the shaft 5.

The cam discs 35 and 36 turn with a uniform greatly geared down number of revolutions. During one revolution of the cam discs, the clamping device associated with each is moved once in the pulling direction and back in the return direction. The course of the curves or cam traces in discs 35 and 36 is laid out in such a way that the small sector with a sharper curvature is intended for the return movement. It is possible to alter the curve radius in the cam discs 35 and 36 so that the levers 33 present on each of the shafts 9 and 10 are pivoted along with their associated shaft. The cam discs 35 and 36 are aligned so that the return movement occurs in the extreme positions of the clamping devices 1 and 2. Pivotal movement of the levers 19 and 20 also pivot the switching shafts 9 and 10 to reverse the direction of movement of the clamping devices. The switching over of the levers 19 and 20 does not take place simultaneously because the clamping devices move at different speeds in the pulling and return directions.

While the invention has been shown and described with reference to a preferred arrangement, it is obvious that equivalent alterations and modifications will occur to others skilled in the art upon a reading and understanding of this specification. The present invention includes all such equivalent alterations and modifications and is limited only by the scope of the appended claims or the equivalents thereof.

Having thus described my invention, I now claim:

1. Apparatus for pulling elongated workpieces including a pair of reciprocating clamping devices movable in pulling and return directions, drive means for driving said clamping devices in said directions, said drive means including rotatable shaft means having generally helical separate pulling and return drive paths thereon, said drive means further including separate pulling and return drive path followers on each said clamping device, switching means for switching said pulling drive path follower into and out of cooperative relationship with said pulling drive path while switching said return drive path follower out of and into cooperative relationship with said return drive path, said switching means including levers mounted on reversing shafts for axial movement therealong and for pivotal movement therewith, said levers having upper ends connected with said clamping devices and other ends having said drive path followers thereon, and said switching means including cam discs for pivoting said reversing shafts when said clamping devices reach the end of a pulling or return stroke.

2. The apparatus as defined in claim 1 wherein each of said clamping devices includes a transversely movable clamping unit, said upper ends of said levers being connected for moving said clamping devices in said pulling and return directions and for moving said clamping units transversely when said levers are pivoted with said reversing shafts.

3. Apparatus for pulling elongated workpieces comprising: a pair of clamping devices mounted for reciprocating movement past one another in pulling and return directions, drive means for driving one of said clamping devices in said pulling direction while driving the other of said clamping devices in said return direction at a greater speed than in said pulling direction, clamping means on each said clamping device for clamping onto a workpiece during movement of said clamping devices in said pulling direction and for releasing the workpiece during movement of said clamping devices in said return direction, said drive means and clamping means being operative such that said clamping devices successively act on an elongated workpiece to continuously pull same at a substantially constant speed in said pulling direction, and said drive means operating for relatively moving said clamping devices slightly toward one another upon transfer of the pulling force on the workpiece from one clamping device to the other and thereby provide for stress relief in that portion of the workpiece located between said clamping devices.

4. The apparatus as defined in claim 3 wherein said drive means includes at least two rotatable shafts having generally helical drive paths theron, one said path being a pulling drive path and the other said path being a return drive path, and said pulling path having a portion of varied pitch for providing said slight movement of said clamping devices toward one another.

5. Apparatus for pulling elongated workpieces comprising: a pair of clamping devices mounted for reciprocating movement past one another in pulling and return directions, at least one elongated rotatable pulling drive shaft and at least one elongated rotatable return drive shaft extending substantially parallel to said pulling and return directions, said pulling drive shaft having a generally helical pulling drive path and said return drive shaft having a generally helical return drive path, each said clamping device having drive path follower means thereon for following said drive paths, switching means for switching said drive path follower means between said pulling and return drive paths, the switching means comprising levers mounted on reversing shafts for axial movement therealong and for pivotal movement therewith, said levers having upper ends connected with said clamping devices and other ends having said drive path follower means thereon, said switching means further including cam discs for pivoting said reversing shafts when said clamping devices reach the end of a pulling or return stroke, said pulling drive shaft and path being operative to drive one of said clamping devices in said pulling direction while said return drive shaft and path drives the other of said clamping devices in said return direction at a greater speed than in said pulling direction, clamping means on each said clamping device for clamping onto a workpiece during movement of said clamping devices in said pulling direction and for releasing the workpiece during movement of said clamping devices in said return direction, and said drive shafts and paths along with said switching means and clamping means being operative such that said clamping devices alternately and successively act on an elongated workpiece to continually pull same at a substantially constant speed in said pulling direction.

6. The apparatus as defined in claim 5 wherein said clamping means on each said clamping device is transversely movable, transverse diverting means for diverting each said clamping means transversely away from the workpiece during movement of each clamping device in said return direction to provide clearance for movement of said clamping devices past one another.

7. The apparatus as defined in claim 5 wherein said pulling path has a slightly changed pitch for slightly moving said clamping devices toward one another for relieving stress in the workpiece between said clamping devices when the pulling force on the workpiece is transferred from one clamping device to the other.

8. The apparatus as defined in claim 5 wherein said drive path follower means comprises roller cones.

* * * * *